US009016759B2

(12) United States Patent
Ricketts et al.

(10) Patent No.: US 9,016,759 B2
(45) Date of Patent: Apr. 28, 2015

(54) VEHICLE INCLUDING NET STRUCTURE

(71) Applicant: Honda Motor Co., Ltd., Minato-ku, Tokyo (JP)

(72) Inventors: Brandon Ricketts, Marysville, OH (US); Hidemi Minami, Dublin, OH (US); Yoshiaki Noda, Saitama (JP); Darin D. King, Raymond, OH (US); Casey Heit, Marysville, OH (US); Tsuyoshi Kumasaka, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 104 days.

(21) Appl. No.: 13/749,938

(22) Filed: Jan. 25, 2013

(65) Prior Publication Data

US 2014/0210234 A1     Jul. 31, 2014

(51) Int. Cl.
*B60R 21/06*  (2006.01)
*B60R 22/24*  (2006.01)

(52) U.S. Cl.
CPC ............ *B60R 21/06* (2013.01); *B60R 22/24* (2013.01)

(58) Field of Classification Search
CPC ......... B60J 5/0487; B60J 5/065; B60R 21/06; B60R 21/131; B60R 22/24; B60R 2021/0074–2021/0083; B60R 2021/028
USPC .............. 280/749, 756, 802, 803; 296/146.1, 296/147, 148, 152
See application file for complete search history.

(56) References Cited

U.S. PATENT DOCUMENTS

| 1,383,027 | A | * | 6/1921 | Robertson | 296/148 |
|---|---|---|---|---|---|
| 1,959,974 | A | * | 5/1934 | Westgate | 5/94 |
| 2,682,427 | A | * | 6/1954 | Bright | 296/148 |
| 2,718,912 | A |   | 9/1955 | Zimmerman | |
| 3,055,700 | A | * | 9/1962 | Glas | 296/148 |
| 3,525,535 | A | * | 8/1970 | Yasusaburo | 280/749 |
| 4,155,578 | A |   | 5/1979 | Rolland | |
| 4,215,895 | A | * | 8/1980 | Phillips | 296/202 |
| 5,201,565 | A |   | 4/1993 | Berardino | |
| 5,290,086 | A | * | 3/1994 | Tucker | 296/152 |
| 5,476,302 | A | * | 12/1995 | Ronci | 296/99.1 |
| 5,713,624 | A | * | 2/1998 | Tower | 296/152 |
| 5,772,370 | A |   | 6/1998 | Moore | |
| 5,879,048 | A |   | 3/1999 | Tower | |
| 6,044,856 | A | * | 4/2000 | Cano | 135/88.07 |
| 6,099,222 | A |   | 8/2000 | Moore | |
| 6,135,497 | A | * | 10/2000 | Sutherland et al. | 280/749 |
| 6,237,939 | B1 | * | 5/2001 | Resh | 280/730.2 |

(Continued)

FOREIGN PATENT DOCUMENTS

| DE | 19501316 C1 | 11/1995 | |
|---|---|---|---|
| EP | 642955 A1 | * 3/1995 | B60R 21/06 |

(Continued)

OTHER PUBLICATIONS

Safety net for occupant protection in a vehicle rollover event, Research Disclosure Database No. 457102, published May 2002.

*Primary Examiner* — Glenn Dayoan
*Assistant Examiner* — Paul Chenevert
(74) *Attorney, Agent, or Firm* — Ulmer & Berne LLP

(57) ABSTRACT

A utility bed includes a bed frame, a side wall, and a door. The door at least partially defines a passageway and is pivotally coupled with the side wall and pivotable between an opened position and a closed position. A securing portion is configured for selective routing through the handle and releasable coupling to an adjacent portion of the utility bed.

13 Claims, 6 Drawing Sheets

(56) References Cited

U.S. PATENT DOCUMENTS

| | | | |
|---|---|---|---|
| 6,454,296 B1* | 9/2002 | Tesch et al. | 280/730.2 |
| 6,464,250 B1 | 10/2002 | Faigle et al. | |
| 6,502,859 B1* | 1/2003 | Svetlik | 280/749 |
| 6,626,462 B2* | 9/2003 | Saczalski et al. | 280/749 |
| 6,672,619 B1 | 1/2004 | Ennerdal et al. | |
| 6,773,054 B2* | 8/2004 | Martini | 296/148 |
| 7,036,869 B1 | 5/2006 | Stipanovich | |
| 7,097,237 B2* | 8/2006 | Weiner et al. | 296/190.11 |
| 7,125,069 B2 | 10/2006 | Cacucci et al. | |
| 7,249,798 B2* | 7/2007 | Saito et al. | 296/205 |
| 7,287,796 B2 | 10/2007 | Coles et al. | |
| 7,464,962 B2 | 12/2008 | Hakansson et al. | |
| 7,735,863 B2 | 6/2010 | Walston et al. | |
| 8,123,279 B2* | 2/2012 | Orr et al. | 296/148 |
| 8,308,223 B2* | 11/2012 | King | 296/190.03 |
| 8,328,235 B2* | 12/2012 | Schneider et al. | 280/748 |
| 8,465,050 B1* | 6/2013 | Spindler et al. | 280/749 |
| 8,714,591 B1* | 5/2014 | Kobayashi et al. | 280/749 |
| 2001/0033073 A1 | 10/2001 | Hammond et al. | |
| 2001/0033084 A1* | 10/2001 | Murray et al. | 296/24.1 |
| 2004/0212217 A1* | 10/2004 | Cacucci et al. | 296/152 |
| 2007/0222255 A1* | 9/2007 | Grindle | 296/146.1 |
| 2011/0156438 A1* | 6/2011 | Ichihara et al. | 296/181.1 |
| 2011/0241325 A1* | 10/2011 | King et al. | 280/756 |
| 2012/0032431 A1* | 2/2012 | King | 280/756 |
| 2012/0161477 A1* | 6/2012 | Furman et al. | 296/203.03 |
| 2013/0087394 A1* | 4/2013 | Sanschagrin et al. | 180/54.1 |
| 2014/0210195 A1* | 7/2014 | Nadeau et al. | 280/756 |
| 2014/0292021 A1* | 10/2014 | Kuroda et al. | 296/146.5 |

FOREIGN PATENT DOCUMENTS

| | | |
|---|---|---|
| FR | 2831501 A1 | 5/2003 |
| GB | 2351711 A | 1/2001 |
| SE | 515145 C2 | 6/2001 |

* cited by examiner

VEHICLE INCLUDING NET STRUCTURE

TECHNICAL FIELD

A utility bed includes a side wall, a door pivotally coupled with the side wall, a handle associated with the door, and a net structure. The net structure includes a securing portion that is configured for selective routing through the handle and releasable coupling to an adjacent portion of the utility bed.

BACKGROUND

Many conventional vehicles, such as multi-use vehicles ("MUVs"), include rear seats and one or more doors for access to the rear seats. During operation of the vehicle, the rear doors can be susceptible to inadvertently opening, which can cause the rear door to contact passing objects.

SUMMARY

In accordance with one embodiment, a utility bed comprises a bed frame, a side wall, a door, and a net structure. The door defines a passageway. The door is pivotally coupled with the side wall and pivotable between an opened position and a closed position. The net structure includes a securing portion. The securing portion of the net structure is configured for selective routing through the passageway and releasable coupling to an adjacent portion of the utility bed.

In accordance with another embodiment, a vehicle comprises a vehicular frame, a plurality of wheels, a roll bar assembly, and a utility bed. Each of the plurality of wheels is rotatably coupled to the vehicular frame. The utility bed is coupled with the vehicular frame and is positioned such that the roll bar assembly at least partially overlies the utility bed. The utility bed comprises a bed frame, a side wall, a front wall, a door, and a net structure. The door is pivotally coupled with the side wall and is pivotable between an opened position and a closed position. The door pivots towards a rear of the vehicle into the opened position. The net structure has a securing portion. The securing portion of the net structure is releasably coupled to at least one of the roll bar assembly and the front wall and, when coupled to the at least one of the roll bar assembly and the front wall, the net structure prevents the door from moving into a fully opened position.

In accordance with yet another embodiment, a vehicle comprises a frame, a door, and a strap. The door defines a passageway and is pivotally coupled with the frame. The door is pivotable between an opened position and a closed position. The strap includes a securing portion. The securing portion of the strap is configured for routing through the passageway and for releasable coupling to the frame. The strap prevents the door from being moved to a fully opened position when the securing portion is coupled to the frame.

BRIEF DESCRIPTION OF THE DRAWINGS

It is believed that certain embodiments will be better understood from the following description taken in conjunction with the accompanying drawings in which.

DETAILED DESCRIPTION

Embodiments are hereinafter described in detail in connection with the views and examples of FIGS. 1-6, wherein like numbers indicate the same or corresponding elements throughout the views. A utility vehicle can include a utility bed which can be used to facilitate hauling of cargo by the utility vehicle. In one embodiment, the utility vehicle can be a dump-type utility vehicle having a utility bed that can facilitate selective dumping of cargo from the utility bed. A dump-type utility vehicle can comprise a light utility vehicle, such as the utility vehicle 10 shown in FIGS. 1-5. In other embodiments, a dump-type utility vehicle can comprise any of a variety of other types of utility vehicles having a utility bed capable of dumping (e.g., a dump bed) such as, for example, a pickup truck, a dump truck, an all-terrain vehicle ("ATV"), and a golf cart, for example. In another embodiment, the utility vehicle can include a non-dump type utility vehicle having a utility bed that is rigidly fixed to the utility vehicle's frame (e.g., a non-dumpable bed). In yet another embodiment, the utility vehicle can include a trailer.

Figure 1:
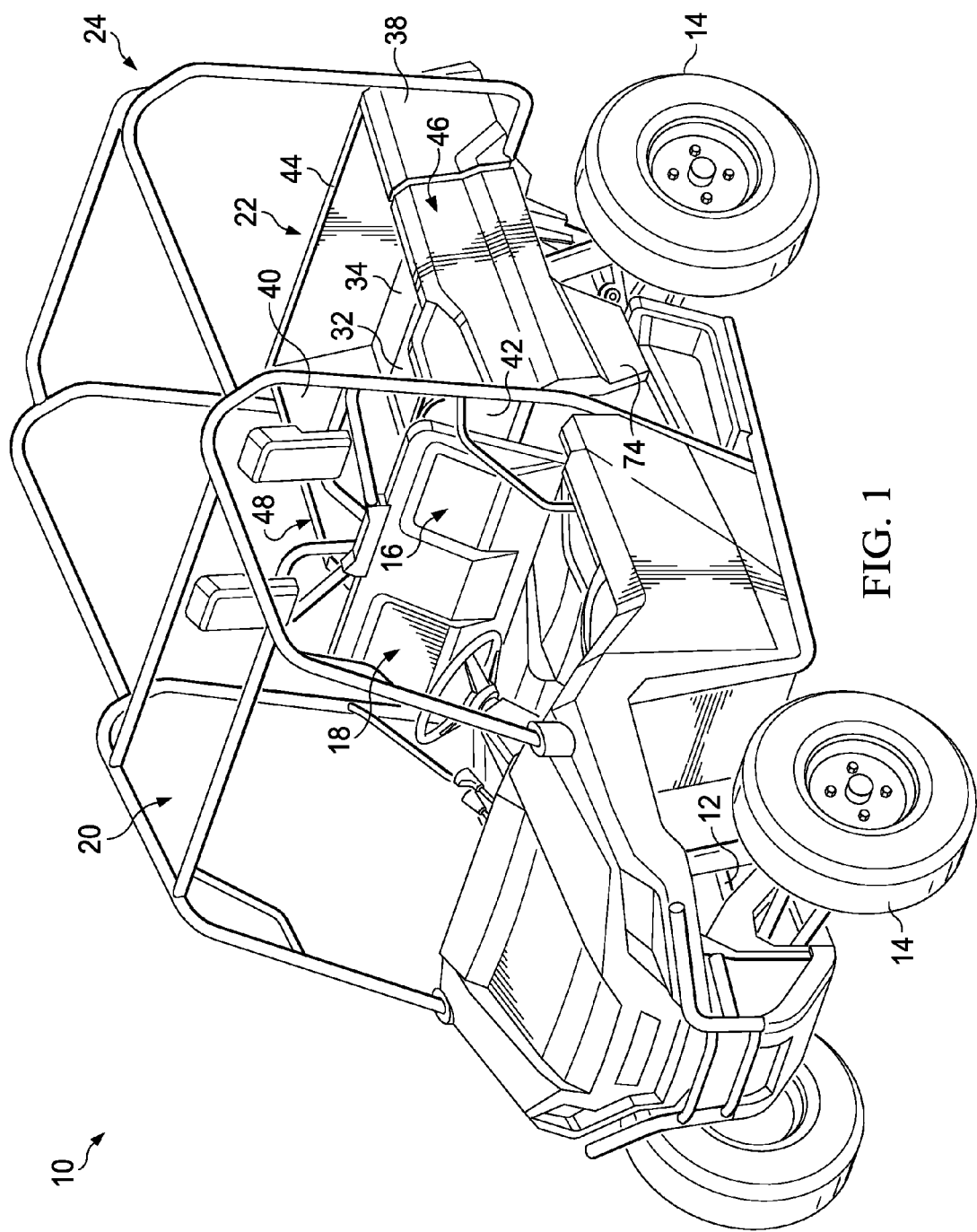
FIG. 1 is a left front perspective view depicting a vehicle having a utility bed and a roll bar assembly, wherein the utility bed includes a left side wall, a right side wall, a left door, a right door, a left rear seat, a right rear seat, and a front wall, in accordance with one embodiment.

Referring to FIG. 1, the utility vehicle 10 can include a vehicular frame 12. The vehicular frame 12 can include any of a variety of structural and/or decorative rails, panels, and/or other components which are typically, although not necessarily, formed from metal (e.g., steel and/or aluminum). It will be appreciated that a vehicular frame can be formed using any of a variety of other materials, such as carbon fiber. A plurality of wheels 14 can be rotatably coupled to the vehicular frame 12. A left front seat 16 and a right front seat 18 can each be supported by the vehicular frame 12 and can facilitate support of occupants within a passenger compartment 20. The utility vehicle 10 can also include a utility bed 22 which can be coupled with the vehicular frame 12, either directly or indirectly, such as through use of a hinge assembly (not shown). The hinge assembly can facilitate pivotable movement of the utility bed 22 with respect to the vehicular frame 12, and between a hauling position (shown in FIG. 1) and a dumping position (not shown). The utility vehicle 10 can further include a roll bar assembly 24 which can be coupled with the vehicular frame 12 and/or the utility bed 22.

Figure 2:
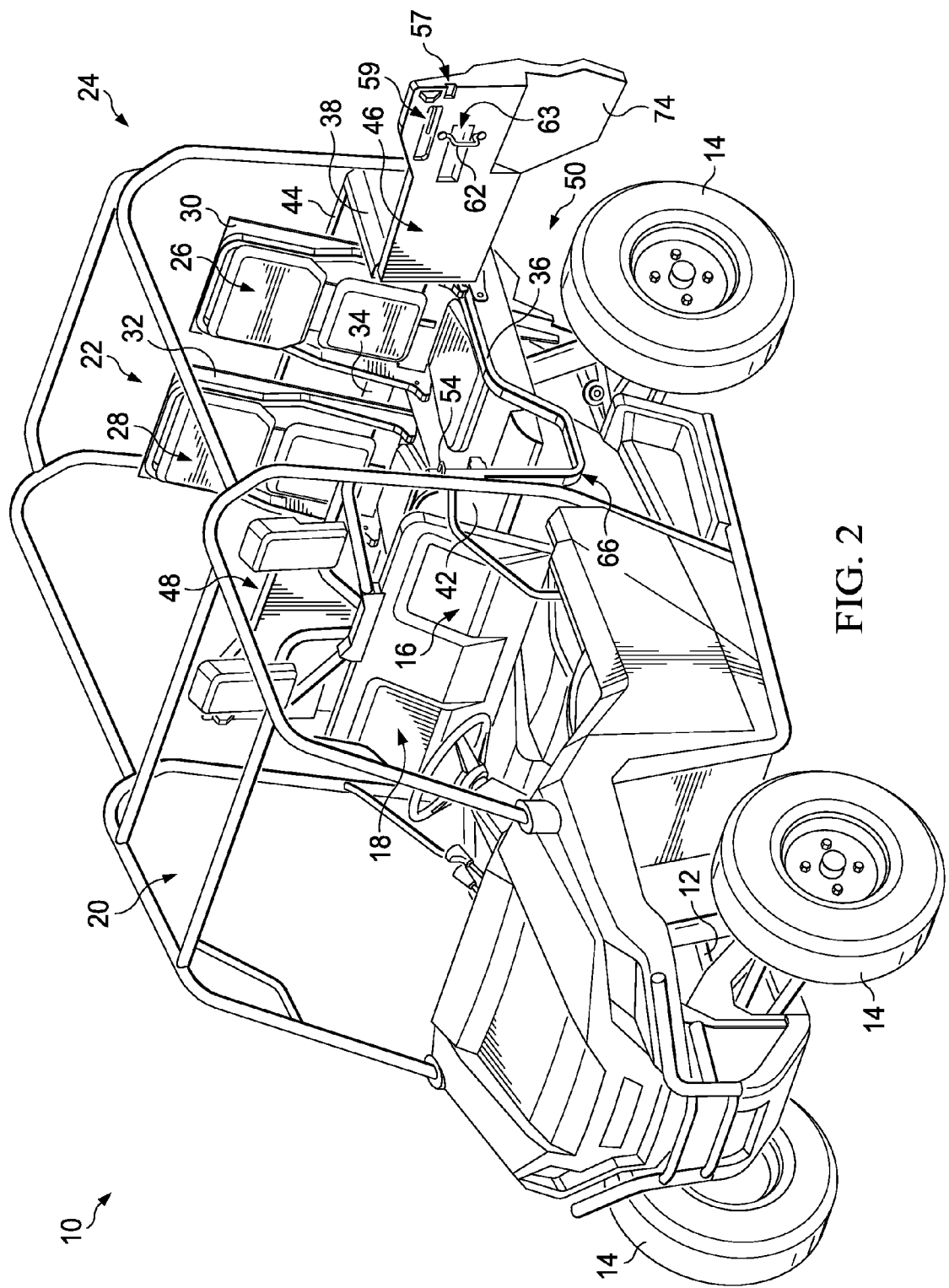
FIG. 2 is a left front perspective view depicting the vehicle of FIG. 1 but with each of the left and right doors shown in respective opened positions, and the left and right rear seats shown in respective deployed positions.

As illustrated in FIG. 2, the utility bed 22 can include a left rear seat 26 and a right rear seat 28. The roll bar assembly 24 can comprise a tubular frame structure configured to overlie the left and right front seats 16, 18 and the left and right rear seats 26, 28 to facilitate overhead protection of seated passengers in any of the seats. It will be appreciated that in other embodiments, a utility vehicle can include a roll bar assembly that can be configured to overlie one or both of a passenger compartment and a utility bed or portions thereof, or which can be configured in any of a variety of other suitable configurations. However, in one embodiment, a utility vehicle might not include a roll bar assembly.

Each of the left and right rear seats 26, 28 can be selectively and independently pivotable between a folded position (FIG. 1) and a deployed position (FIG. 2). When the left and right rear seats 26, 28 are in their respective folded positions, their respective cover panels 30, 32 can facilitate support of cargo within the utility bed 22. For example, the utility bed 22 is shown to comprise a bed floor 34 adjacent to the left and right rear seats 26, 28. When the left and right rear seats 26, 28 are in their respective folded positions, the left and right cover panels 30, 32 can cooperate with the bed floor 34 to define a cargo support surface for the utility bed 22. When the left and right rear seats 26, 28 are in their respective deployed positions, the left and right rear seats 26, 28 can facilitate support of passengers behind the left and right front seats 16, 18, respectively.

In certain embodiments, each of the left and right rear seats 26, 28 can be pivotally coupled to a bed frame 36 such that each of the left and right rear seats 26, 28 is pivotable between the folded position and the deployed position. In one such embodiment, each of the left and right rear seats 26, 28 can be pivotally coupled to the bed frame 36 by one or more back hinges (not shown). It will be appreciated that left and right rear seats can be movably coupled with a bed frame in any of a variety of suitable alternative arrangements. In certain embodiments, each of the left and right rear seats 26, 28 can include a locking member (not shown) that can facilitate selective retention of the left and right rear seats 26, 28 in either the folded position or the deployed position.

It will be appreciated that, although the embodiment depicted in FIGS. 1-5 illustrates forward-facing rear seats which are disposed towards a front-most portion of the utility bed 22, rear seats can be provided on a utility bed in any of a variety of suitable alternative arrangements. In one embodiment, left and right rear seats can comprise rearward-facing seats. And although the embodiments above have been described with respect to individual left and right rear seats, it will be appreciated that in other embodiments a utility bed can include more than two seats or less than two seats. In yet another embodiment, a utility bed can provide a bench-type rear seat.

Still referring to FIGS. 1-2, the utility bed 22 is shown to include a left side wall 38 and a right side wall 40 extending generally perpendicularly from the bed floor 34 or locations adjacent to the bed floor 34. The utility bed 22 is also shown to include a front wall 42 and a tailgate 44. The tailgate 44 can be pivotally coupled with respect to the bed floor 34. When the utility bed 22 is in the hauling position, as shown in FIG. 1, the left side wall 38, the right side wall 40, and the front wall 42 can cooperate with the bed floor 34 to retain cargo within the utility bed 22. The tailgate 44, when closed, as shown in FIGS. 1-2, can also cooperate with the left side wall 38, the right side wall 40, and the bed floor 34 to retain cargo within the utility bed 22. It will be appreciated that the tailgate 44 can be selectively opened to facilitate loading of the utility bed 22 and/or to allow cargo (e.g., dirt) to pour from the utility bed 22 when the utility bed 22 is in a dumping position (not shown). In another embodiment, it will be appreciated that a rear wall (not shown) can be provided in lieu of a tailgate with the rear wall being rigidly affixed with respect to a bed floor of a utility bed such that it might not be capable of being selectively opened by an operator. In yet another alternative embodiment, it will be appreciated that one or more side walls (e.g., 38 and/or 40) of a utility bed might be capable of being selectively opened (e.g., like a tailgate 44) by an operator. In still another alternative embodiment, it will be appreciated that a utility bed can include one or more side walls but not a tailgate and/or rear wall.

The utility bed 22 is shown in FIGS. 1-5 to include respective left and right doors 46, 48. Each of the left and right doors 46, 48 can be pivotable between a closed position (FIG. 1) and an opened position (FIG. 2). When in their respective closed positions, each of the left and right doors 46, 48 can cooperate with the left and right side walls 38, 40, the front wall 42, and the bed floor 34 to retain cargo within the utility bed 22. In certain embodiments, each of the left and right doors 46, 48 can further cooperate with a tailgate 44 and/or rear wall, as set forth above, to retain cargo within the utility bed 22. When the left and right doors 46, 48 are moved to the opened position, left and right openings (left opening 50 shown in FIG. 2) can be defined and can provide a passenger ingress/egress to/from the left and right rear seats 26, 28.

In certain embodiments, and as shown in FIGS. 1-5, the left and right doors 46, 48 can comprise rear-hinged doors that are pivotally coupled with the left and right side walls 38, 40, respectively, such that the left and right doors 46, 48 can be selectively opened towards a rear of the utility bed 22. Opening the left and right doors 46, 48 towards the rear of the utility bed 22 can permit more direct access to the left and right rear seats 26, 28 than might be otherwise be available with front-hinged doors. In one embodiment, a seal (not shown) can be provided along the perimeter of each of the left and right doors 46, 48. Each seal can facilitate selective sealing of the interaction between the door (e.g., 46, 48) and the adjacent side wall (e.g., 38, 40).

It will be appreciated that in other embodiments, left and right doors 46, 48 can include front-hinged doors or any of a variety of suitable alternate door arrangements and can be pivotally coupled with respective left and right side walls or any other portion of a vehicle frame. Furthermore, although the embodiment of FIGS. 1-5 shows the utility bed 22 to include both left and right doors 46, 48, in other embodiments, a utility bed can include one door, wherein the door is one of a left door and a right door, or more than two doors.

Figure 4:
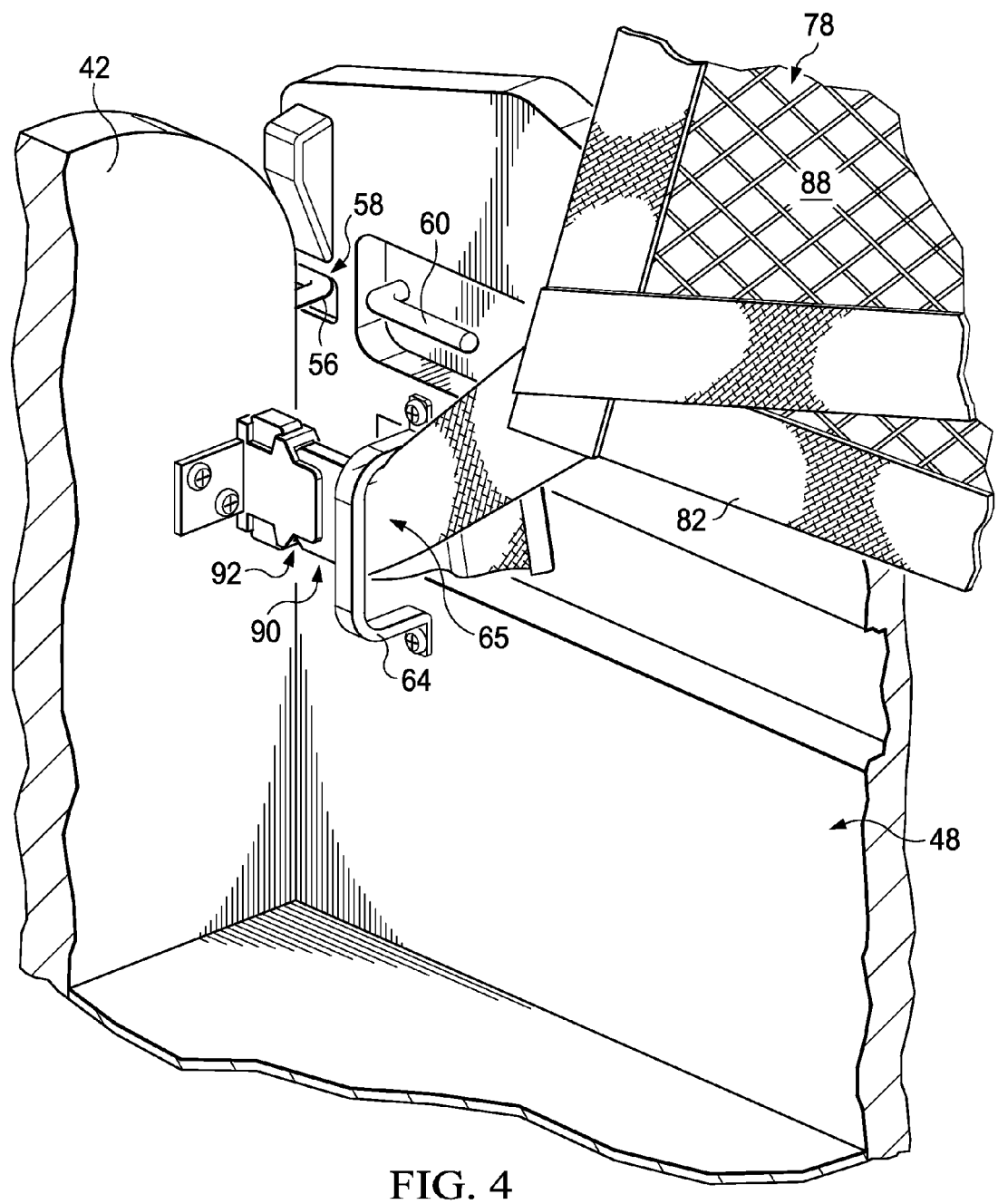
FIG. 4 is an enlarged view depicting the arrangement of FIG. 3 with the securing portion of the right net structure routed through the right handle and releasably coupled with the front wall.

The vehicle can include respective left and right latch assemblies that facilitate selective releasable retention of the left and right doors 46, 48 in their closed positions. As illustrated in FIGS. 2 and 4, the left and right latch assemblies can include respective left and right strikers 54, 56 (FIGS. 2 and 4, respectively) and respective left and right latches 57, 58 (FIGS. 2 and 4, respectively). Each of the left and right strikers 54, 56 can selectively engage the left and right latches 57, 58, respectively, to retain the left and right doors 46, 48 in their respective closed positions. Each of the left and right doors 46, 48 can also include respective left and right release mechanisms 59, 60 (FIGS. 2 and 4, respectively) that can be grasped by a user's hand and actuated to release the left and right doors 46, 48 from their closed positions.

The bed frame 36 can be configured to provide underlying and structural support for certain components of the utility bed 22. As illustrated in FIG. 2, the bed frame 36 can comprise a tubular frame structure that extends along a perimeter and/or underneath the bed floor 34 and provides underlying support for the bed floor 34, the left and right side walls 38, 40, and/or the front wall 42. The bed frame 36 can include U-shaped foot portions (e.g., 66) that are provided adjacent to a foot well for the left and right rear seats 26, 28. It will be appreciated that a bed frame can be provided in any of a variety of suitable alternative arrangements. For example, a bed frame might be integrally formed as part of a bed floor such as in a one-piece bed floor/bed frame configuration.

In certain embodiments, a foot well tray (not shown) can underlie the U-shaped foot portions (e.g., 66) such that the weight of a passenger stepping on the U-shaped foot portions (e.g., 66) can be additionally borne by the foot well tray. The U-shaped foot portions (e.g., 66) and/or the foot well tray can be provided with an anti-skid surface or other suitable material (not shown) that can improve the overall effective footing for a passenger.

As illustrated in FIGS. 1-2, the left and right doors 46, 48 can include respective left and right lower wing portions (left lower wing portion 74 shown in FIGS. 1 and 2) that have substantially the same general overall shape as the U-shaped foot portions (e.g., 66). When the left and/or right door 46, 48 is in the closed position, the respective lower wing portions (e.g., 74) can prevent a passenger's feet from inadvertently leaving the foot well, such as during a sharp turn or during traversal of uneven terrain, for example. The lower wing portions (e.g., 74) can also conceal the U-shaped foot portions (e.g., 66) when the left and right doors 46, 48 are closed which can contribute to the overall aesthetics of the utility bed 22.

Figure 3:
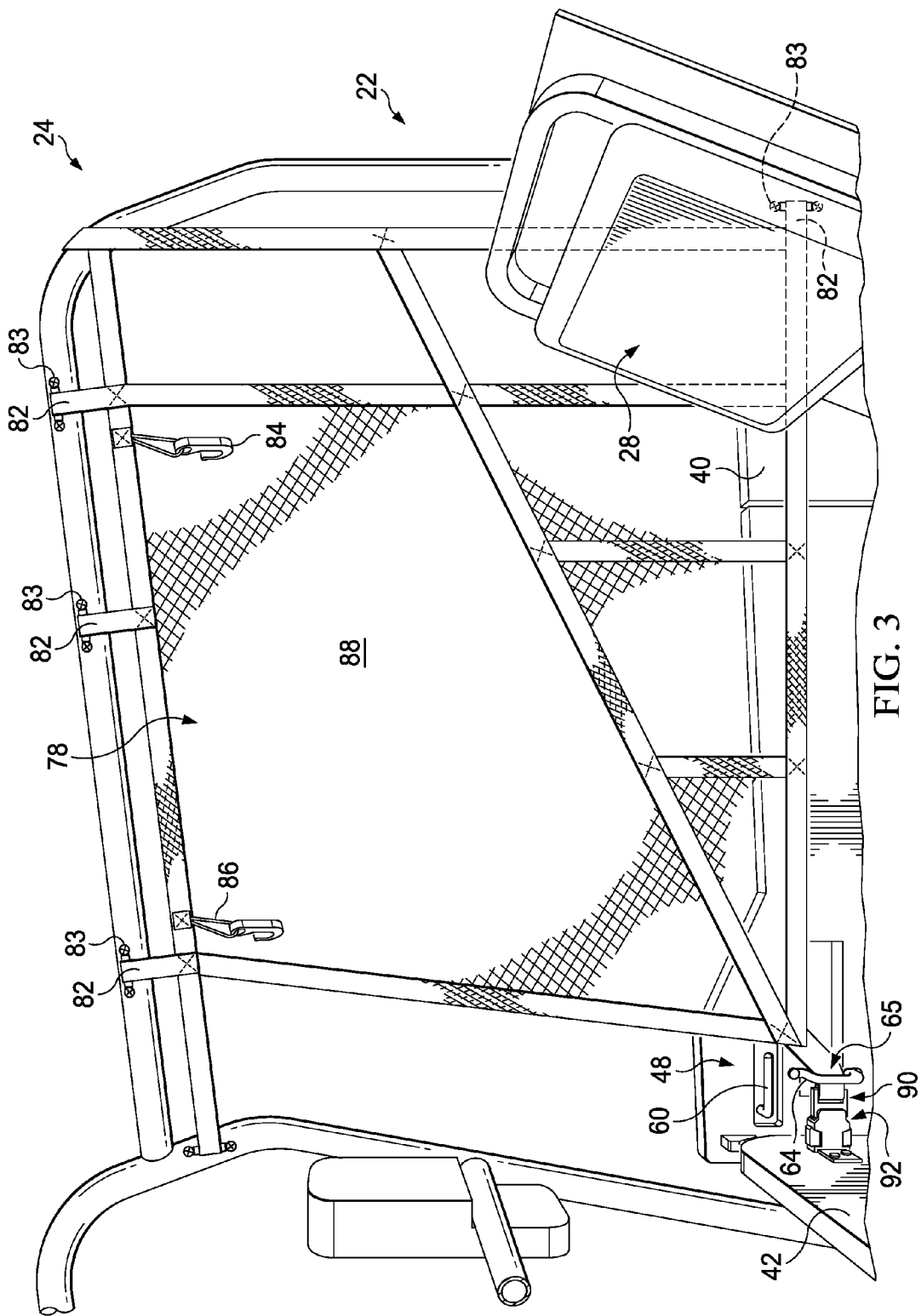
FIG. 3 is an enlarged view depicting a right net structure coupled to the utility bed and the roll bar assembly of FIG. 1, in accordance with one embodiment, with a securing portion of the right net structure routed through a right handle and releasably coupled to the front wall.

As illustrated in FIG. 3, the utility vehicle 10 can include a right net structure 78, which can be provided adjacent to the right seat 28 and the right door 48. The right net structure 78 can be coupled to and at least partially supported by the roll bar assembly 24 and can cooperate with the roll bar assembly 24 and the utility bed 22 to block the area adjacent the right seat 28 above the right sidewall 40 and the right door 48. The right net structure 78 can accordingly prevent a passenger from exposure to areas outside of the utility vehicle 10 (e.g., during a rollover event). Referring again to FIG. 3, the right net structure 78 is shown to be coupled to the right side wall 40, the front wall 42, and the roll bar assembly 24 adjacent to the right rear seat 28. The right net structure 78 can include straps 82 that facilitate coupling of the right net structure 78 to brackets 83 secured to the roll bar assembly 24 and to the right side wall 40. The right net structure 78 can also include hooks (e.g., 84) that are associated with bungee cords (e.g., 86) and which can cooperate with each other and with adjacent portions of the right net structure 78 to facilitate storage of the right net structure 78 along an upper portion of the roll bar assembly 24. The straps 82 are shown to provide a framework for a net portion 88 of the right net structure 78. While the right net structure 78 is shown in FIG. 3 to have a quadrilateral shape with the straps 82 extending therefrom and therethrough, it will be appreciated that a net structure can assume any of a variety of suitable shapes and can be provided in any variety of suitable configurations. For example, the straps 82 can include D-rings for releasable coupling of the right net structure 78 to the roll bar assembly 24 and the right side wall 40. However, it will be appreciated that a net structure can be coupled to a roll bar assembly and/or a utility bed with any of a variety of suitable connectors in any of a variety of suitable configurations. For example, in such an embodiment wherein a utility vehicle does not include a roll bar assembly, a net structure can be coupled to a utility bed and/or portions of a vehicle's frame such that the net structure can cover the utility bed or a portion thereof.

It will be appreciated that a left net structure can be provided that is similar, if not identical to, the right net structure 78 and can be coupled to the utility vehicle 10 in a similar manner, but with respect to the left side wall 38 and the left rear seat 26. Thus, in certain embodiments, left and right net structures can be coupled to a roll bar assembly and left and right side walls, respectively, such that the left and right net structures are coupled to a utility bed adjacent to left and right doors, respectively. In another embodiment, a singular net structure can be coupled to each of left and right side walls such that the net structure can extend over the roll bar assembly and be coupled to a utility bed adjacent to each of left and right doors.

Figure 5:
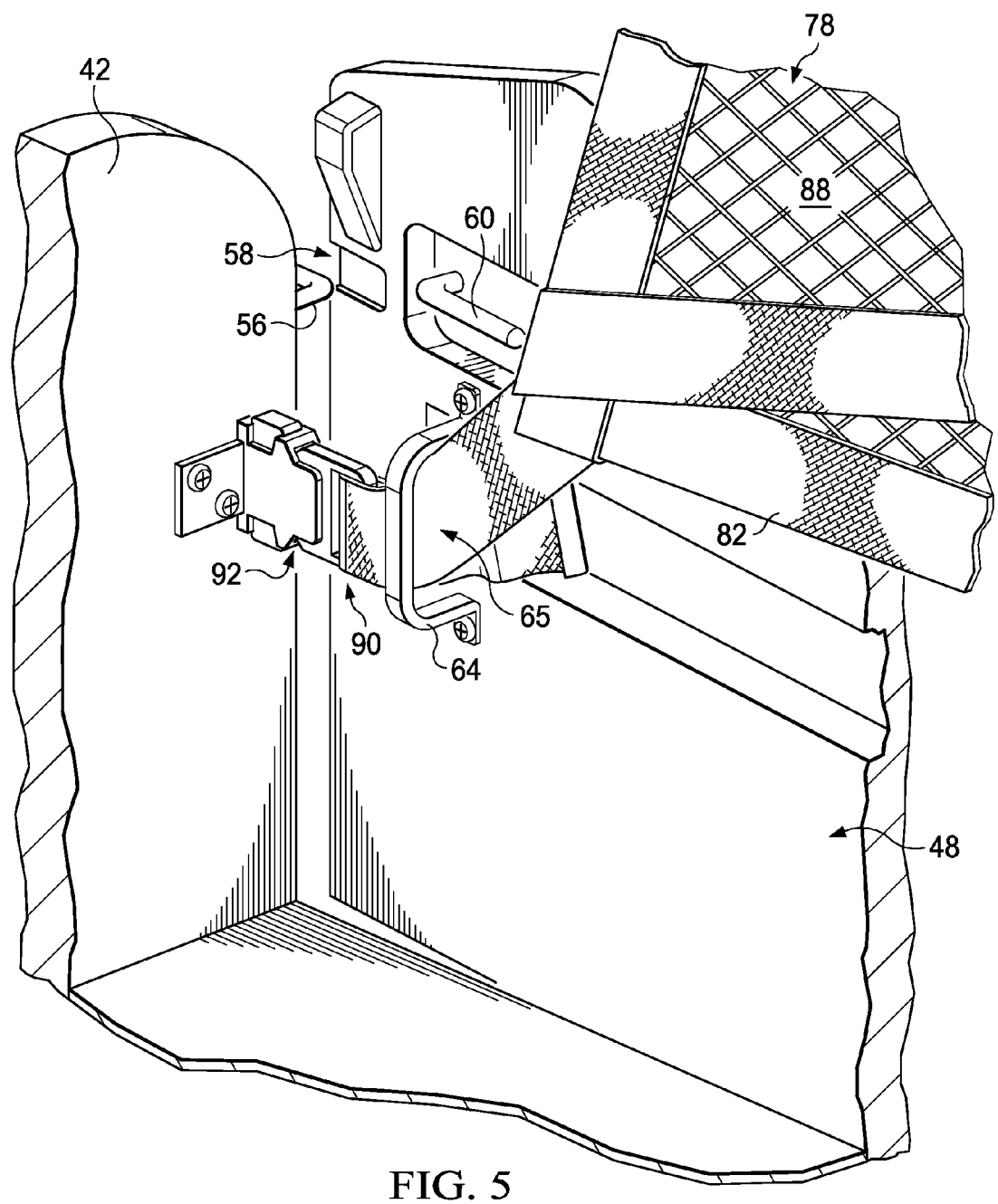
FIG. 5 is an enlarged view depicting the arrangement of FIG. 4, but with the right door shown in a partially opened position and the securing portion interacting with the right handle and the front wall to prevent the right door from further opening.

As illustrated in FIGS. 3-5, the right door 48 can include a right handle 64 that cooperates with adjacent portions of the right door 48 to define a passageway 65. The right handle 64 can be configured to provide a grasping location for a passenger to urge the right door 48 into/from the closed position. The right handle 64 can cooperate with the right net structure 78 and the front wall 42 to assist in preventing the right door 48 from being moved to a fully opened position. As illustrated in FIG. 3, the right net structure 78 can include a securing portion 90 which can be configured for selective routing through the passageway 65 and releasable coupling to an adjacent portion of the utility bed 22. More particularly, the securing portion 90 of the right net structure 78 can include a male portion of a side-release buckle arrangement 92 which can be configured for insertion into a female portion of the side-release buckle arrangement 92 secured to the front wall 42. In another embodiment, a side-release buckle arrangement can be arranged such that the male portion is attached to a front wall and a female portion is attached to a strap of a net structure.

As illustrated in FIG. 5, when the right door 48 is opened with the securing portion 90 routed through the passageway 65 and attached to the front wall 42, the right door 48 can be prevented from moving into a fully opened position. Therefore, if the right door 48 is opened, such as through inadvertent actuation of the release mechanism 60 or failure of the right latch assembly, the connection between the front wall 42 and the coupling portion 90 can remain intact, thereby holding the right door 48 close to the front wall 42. This can prevent the right door 48 from contacting passing objects and can also prevent a seated passenger from inadvertently exiting the utility vehicle 10 through the right door 48. In addition, a front portion of the right net structure 78 can remain intact with the front wall 42 thereby blocking the area above the right side wall 40 and the right door 48. When it is desirable to open the right door 48 such as to enter or exit the right seat 28, a passenger can release the securing portion 90 from the front wall 42 which can permit the right door 48 to be opened as well as permit the front portion of the right net structure 78 to be moved out of the way. The right handle 64 and the securing portion 90 can accordingly serve as a secondary door-restraint system for the right door 48.

Though the right handle 64 is shown in FIGS. 3-5 to be coupled to an interior portion of the right door 48 and in a generally vertical configuration, it will be understood that a handle can be coupled to an interior or exterior portion of a door in any of a variety of suitable configurations. While the securing portion 90 is shown in FIGS. 3-5 to extend from a strap 82, it will be appreciated that a securing portion can assume any of a variety of suitable configurations. It will also be understood, that although the securing portion 90 is shown in FIGS. 3-5 to be releasably coupled to the front wall 42 with a side-release buckle arrangement 92, it will be appreciated that a securing portion can be releasably coupled to a utility bed, roll bar assembly, or other portion of a body or frame (e.g., a bed floor) in any variety of suitable configurations and/or with any of a variety of suitable connectors such that a net structure can cooperate with a door having a handle to assist in selectively preventing the door from being moved to a fully opened position.

It will be appreciated that a passageway for routing of a securing portion can be configured in any of a variety of suitable alternative arrangements. For example, a handle can be integrally molded (e.g., one piece construction) into the door and can define a passageway for routing of a securing portion. In another example, a passageway might not be defined by a handle but instead defined by a structure that might be inconvenient for use as a handle (i.e. a passageway provided along an outer edge of a door and/or along a door jamb).

The left net structure (not shown) can also include a securing portion that is configured to route through a passageway 63 defined by a left handle 62 (or other passageway) and secure to an area adjacent to the left door 46 in a similar manner as described with respect to the right net structure 78. Thus, in certain embodiments, each of left and right doors can be secured by a secondary door-restraint system. In one such embodiment, a securing portion on each of left and right net structures can be routed through respective left and right passageways on the respective left and right doors and releasably coupled to an adjacent portion of a utility bed. In another such embodiment, securing portions on a singular net structure can be routed through each of left and right handles on respective left and right doors and releasably coupled to an adjacent portion of a utility bed.

Figure 6:
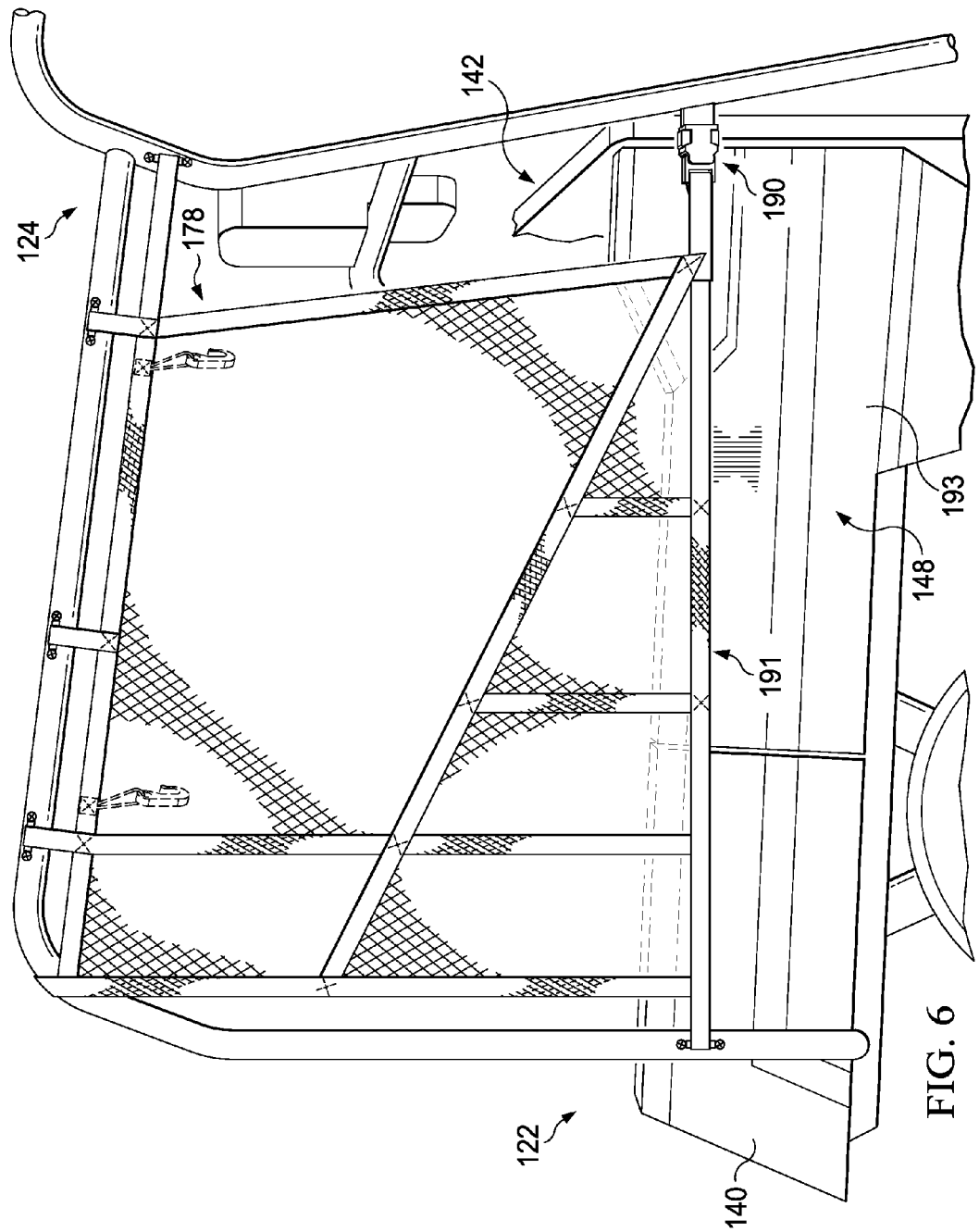
FIG. 6 is an enlarged view depicting a right net structure coupled to a utility bed and a roll bar assembly, in accordance with another embodiment, with a securing portion of the right net structure coupled to the roll bar assembly and with a lower portion of the net structure overlapping a right door.

FIG. 6 illustrates a right net structure 178 associated with a utility bed 122 according to another embodiment. The utility bed 122 can be similar to, or the same in many respects to the utility bed 22 shown in FIGS. 1-5. For example, the utility bed 122 can include a right side wall 140, a front wall 142, and a right door 148. The right door 148 can be pivotable with respect to the right side wall 140 between a closed position (FIG. 6) and an opened position (not shown). The right door 148 is shown to be capable of pivoting toward a rear of the vehicle into the opened position. The right net structure 178 includes a securing portion 190 and is shown to be coupled to the right side wall 140, the front wall 142, and an overlying roll bar assembly 124.

The right net structure 178, however, is routed along an outside of the utility bed 122. A lower portion 191 of the net structure overlaps the right door 148 such that it is positioned for contact with an outer surface 193 of the right door 148. The securing portion 190 is releasably coupled to the roll bar assembly 124 in a similar manner as described above with respect to securing portion 90 and the front wall 42. When the securing portion 190 is coupled with the roll bar assembly 124, and the right door 148 is moved away from the closed position, the lower portion 191 contacts the outer surface 193 of the right door 148 thereby preventing the right door 148 from being pivoted to a fully opened position. When a passenger desires to enter or exit through the right door 148, the securing portion 190 can be released from the roll bar assembly 124 and the right net structure 178 can be moved out of the way of the right door 148. In an alternative embodiment, the securing portion 190 can instead be coupled with the front wall 142. It will be appreciated that a left net structure (not shown) can be provided in a similar manner as the right net structure 178 but instead associated with a left door (not shown) of the utility bed 122.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A utility bed comprising:
a bed frame;
a side wall;
a door defining a passageway, the door being pivotally coupled with the side wall and pivotable between an opened position and a closed position; and
a net structure having a securing portion;
wherein the securing portion of the net structure is configured for selective routing through the passageway and releasable coupling to an adjacent portion of the utility bed.

2. The utility bed of claim 1 further comprising a handle coupled with the door, wherein the handle cooperates with adjacent portions of the door to define the passageway.

3. The utility bed of claim 1 wherein:
the side wall comprises one of a left side wall and a right side wall; and
the door comprises one of a left door and a right door.

4. The utility bed of claim 1 wherein the door is pivotable towards a rear of the utility bed into its opened position.

5. The utility bed of claim 4 further comprising a front wall.

6. The utility bed of claim 5 wherein the securing portion of the net structure is configured for releasable coupling to the front wall.

7. The utility bed of claim 6 wherein the door includes a latch that selectively interacts with the front wall to facilitate releasable coupling of the door in its closed position.

8. The utility bed of claim 1 wherein the securing portion of the net structure further comprises a side-release buckle arrangement and wherein the net structure is coupled to and supported at least partially by an adjacent roll bar assembly.

9. The utility bed of claim 8 wherein the securing portion comprises a strap which is releasably coupled to the front wall with the side-release buckle arrangement.

10. A vehicle comprising:
a frame;
a door defining a passageway and pivotally coupled with the frame, the door being pivotable between an opened position and a closed position; and
a strap having a securing portion;
wherein the securing portion of the strap is configured for routing through the passageway and for releasable coupling to the frame and wherein the strap prevents the door from being moved to a fully opened position when the securing portion is coupled to the frame.

11. The vehicle of claim 10 further comprising a handle coupled with the door, wherein the handle cooperates with adjacent portions of the door to define the passageway.

12. The vehicle of claim 10 wherein the door comprises a rear door.

13. The vehicle of claim 10 further comprising a net structure and wherein the strap is part of the net structure.

\* \* \* \* \*